US008979127B2

(12) United States Patent
Bang

(10) Patent No.: US 8,979,127 B2
(45) Date of Patent: Mar. 17, 2015

(54) STEERING COLUMN FOR VEHICLE

(71) Applicant: Mando Corporation, Pyeongtaek-si (KR)

(72) Inventor: Gwi Sik Bang, Seongnam-si (KR)

(73) Assignee: Mando Corporation, Pyeongtaek-Si (KR)

( * ) Notice: Subject to any disclaimer, the term of this patent is extended or adjusted under 35 U.S.C. 154(b) by 0 days.

(21) Appl. No.: 14/024,553

(22) Filed: Sep. 11, 2013

(65) Prior Publication Data

US 2014/0069223 A1 Mar. 13, 2014

(30) Foreign Application Priority Data

Sep. 11, 2012 (KR) .................. 10-2012-0100347

(51) Int. Cl.
*B62D 1/184* (2006.01)
*B62D 1/185* (2006.01)

(52) U.S. Cl.
CPC ............. *B62D 1/185* (2013.01); *B62D 1/184* (2013.01)
USPC ........................... 280/775; 74/493

(58) Field of Classification Search
USPC ........................... 280/775; 74/493
See application file for complete search history.

(56) References Cited

U.S. PATENT DOCUMENTS

| 6,276,719 | B1 * | 8/2001 | Gartner ................... 280/775 |
| 7,252,019 | B2 * | 8/2007 | Lee ........................ 74/493 |
| 8,550,497 | B2 * | 10/2013 | Takezawa et al. ........... 280/775 |
| 8,578,812 | B2 * | 11/2013 | Minamigata .............. 74/492 |
| 8,601,901 | B2 * | 12/2013 | Ishii et al. ................ 74/493 |
| 2003/0101839 | A1 * | 6/2003 | Duncan et al. ............. 74/493 |
| 2004/0084886 | A1 * | 5/2004 | Yamamoto ................ 280/775 |
| 2004/0090058 | A1 * | 5/2004 | Yamamoto ................ 280/775 |
| 2005/0035584 | A1 * | 2/2005 | Camp et al. ................ 280/775 |
| 2006/0243088 | A1 * | 11/2006 | Cymbal et al. ............. 74/492 |
| 2009/0044657 | A1 * | 2/2009 | Osawa et al. .............. 74/493 |
| 2009/0066070 | A1 * | 3/2009 | Ueno et al. ................ 280/775 |
| 2010/0294072 | A1 * | 11/2010 | Ishii et al. ................ 74/493 |
| 2012/0304797 | A1 * | 12/2012 | Tinnin et al. ............... 74/493 |
| 2013/0074641 | A1 * | 3/2013 | Schnitzer et al. ............ 74/493 |
| 2013/0298718 | A1 * | 11/2013 | Ohara ...................... 74/493 |
| 2014/0000405 | A1 * | 1/2014 | Anspaugh et al. ........... 74/493 |

FOREIGN PATENT DOCUMENTS

DE   10-2006-028-832 A1   12/2007
GB        2-263-756 A      8/1993

* cited by examiner

*Primary Examiner* — Ruth Ilan
*Assistant Examiner* — Barry Gooden, Jr.
(74) *Attorney, Agent, or Firm* — McDermott Will & Emery LLP

(57) ABSTRACT

Disclosed is a steering column for a vehicle. According to the present invention, as an adjusting bolt passing through a telescope slot to be coupled to the telescopic slot is slid in stages in the telescopic slot during a telescopic operation for adjusting a location of a steering wheel, a user can accurately and easily adjust the location of the steering wheel.

7 Claims, 11 Drawing Sheets

STEERING COLUMN FOR VEHICLE

CROSS-REFERENCE TO RELATED APPLICATION

This application claims priority from and the benefit under 35 U.S.C. §119(a) of Korean Patent Application No. 10-2012-0100347, filed on Sep. 11, 2012, which is hereby incorporated by reference for all purposes as if fully set forth herein.

BACKGROUND OF THE INVENTION

1. Field of the Invention

The present invention relates to a steering column for a vehicle, and more particularly to a steering column for a vehicle which can allow a user to accurately and easily adjust a location of a steering wheel as an adjusting bolt is moved in stages in a telescope slot when a telescope is operated.

2. Description of the Prior Art

As demands on a driver-oriented intelligent vehicle increase due to various demands of consumers, tilt and telescope steering systems for adjusting a relative location of a steering wheel with respect to a driver are increasingly mounted so that a driver can conveniently manipulate the steering wheel in this trend. Here, a tilt and telescope steering system refers to a system for adjusting a location of a steering wheel used in a car, and adjustments of a location of the steering system includes a tilt operation and a telescope operation.

First, the tilt operation refers to an adjustment of a vertical fixing angle of the steering wheel, and the telescope operation refers to an adjustment of a distance between the steering wheel and the driver which is made by making the length of the steering column longer or shorter.

FIG. 1 is a perspective view showing a part of a steering column for a vehicle according to the related art.

Referring to FIG. 1, the steering column for a vehicle according to the related art includes: an outer tube 100 accommodating a steering shaft 175 connected to a steering wheel 103; an inner tube 170 introduced into the outer tube 100; a lower bracket 165 fixing the inner tube 170 to a vehicle body; a mounting bracket 105 installed at an upper side of the outer tube 100 to be fixed to the vehicle body; a telescope bracket 180 integrally fixed to the outer tube 100 and having a telescope slot 185; a tilt bracket 150 integrally formed with the mounting bracket 105 and in which a tilt slot 110 is formed to be long; a tilt fixing gear 145 formed on an outer surface of the tilt bracket 150; a tilt actuating gear 140 engaged with or disengaged from the tilt fixing gear 145; an adjusting bolt 130 passing through the tilt slot 110; a cam 135 engaged with the tilt actuating gear 140; a washer 125 and a nut 120 fixing the cam 135 and a tilt lever; and a gear spring 142 located between the tilt actuating gear 140 and the tilt fixing gear 145.

The telescopic operation is completed by releasing the tilt lever 115, changing a location of the adjusting bolt 130 along the telescope slot 185 formed in the telescope bracket 180, and fastening the tilt lever 115.

The tilt operation is completed by releasing the tilt lever 115, changing a location of the adjusting bolt 130 along the tilt slot 110, and fastening the tilt lever 115.

Although the tilt fixing gear 145 and the tilt actuating gear 140 are attached to each other such that the outer tube 100 and the steering shaft 175 are fixed while the tilt lever 115 is locked, the tilt actuating gear 140 is separated from the tilt fixing gear 145 by the cam 135 if the tilt lever 115 is released so that the outer tube 100 and the inner tube 170 can be moved in a tilting direction with respect to a lower tilt center 160.

Here, the gear spring 142 is fitted with and mounted on the adjusting bolt 130 between the tilt fixing gear 145 and the tilt actuating gear 140 to space the tilt actuating gear and the tilt fixing gear 145 which are engaged with each other when the tilt lever 115 is released from each other.

However, since the steering column for a vehicle according to the related art cannot adjust a movement distance of the adjusting bolt in the telescope slot when a driver uses the telescopic function, the driver cannot easily locate the steering wheel at a desired location.

SUMMARY OF THE INVENTION

Accordingly, the present invention has been made to solve the above-mentioned problems occurring in the prior art, and an object of the present invention is to provide a steering column for a vehicle in which an adjusting bolt can be moved in stages in a telescope slot during a telescopic operation to allow a user to accurately and easily adjust a location of the steering wheel.

The object of the present invention is not limited thereto, and other unmentioned objects will be clearly understood by those skilled in the art from the following description.

In accordance with another aspect of the present invention, there is provided a steering column for a vehicle, including: a telescope guide having a telescope slot in which narrow width portions and wide width portions are alternately disposed; and an adjusting bolt passing through the telescope slot to be coupled to the telescope slot, wherein a resiliently deformed portion of a resilient material is coupled to a portion of the adjusting bolt corresponding to the telescope slot such that the adjusting bolt are slid in stages during a telescopic operation.

In accordance with another aspect of the present invention, there is provided a steering column for a vehicle, including: a telescopic guide having a telescope slot in an axial direction thereof; a resilient telescope bush coupled to the telescope slot and in which narrow width portions and wide width portions are alternately disposed; and an adjusting bolt passing through the telescope bush to be coupled to the telescope bush and configured to be slid during a telescopic operation.

According to the present invention, as an adjusting bolt passing through a telescope slot to be coupled to the telescopic slot is slid in stages in the telescopic slot during a telescopic operation for adjusting a location of a steering wheel, a user can accurately and easily adjust the location of the steering wheel.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
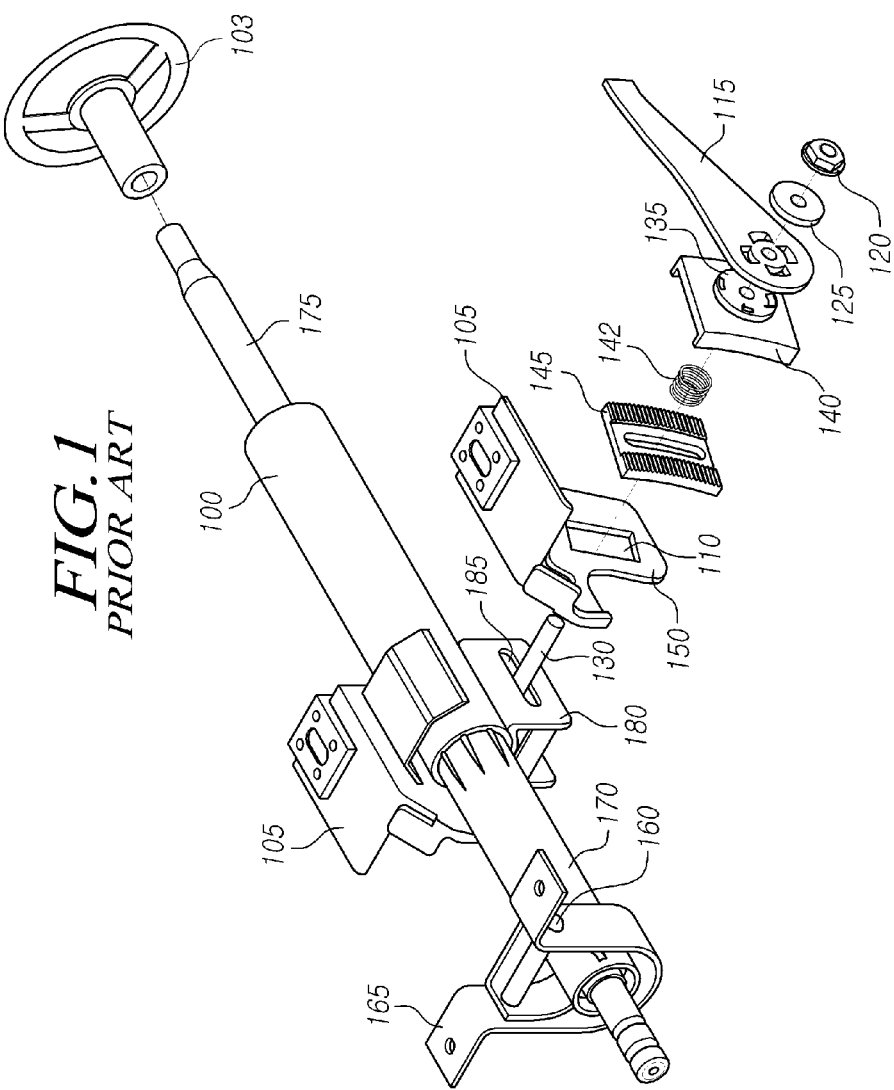
FIG. 1 is a perspective view showing a part of a steering column for a vehicle according to the related art.
Figure 2:
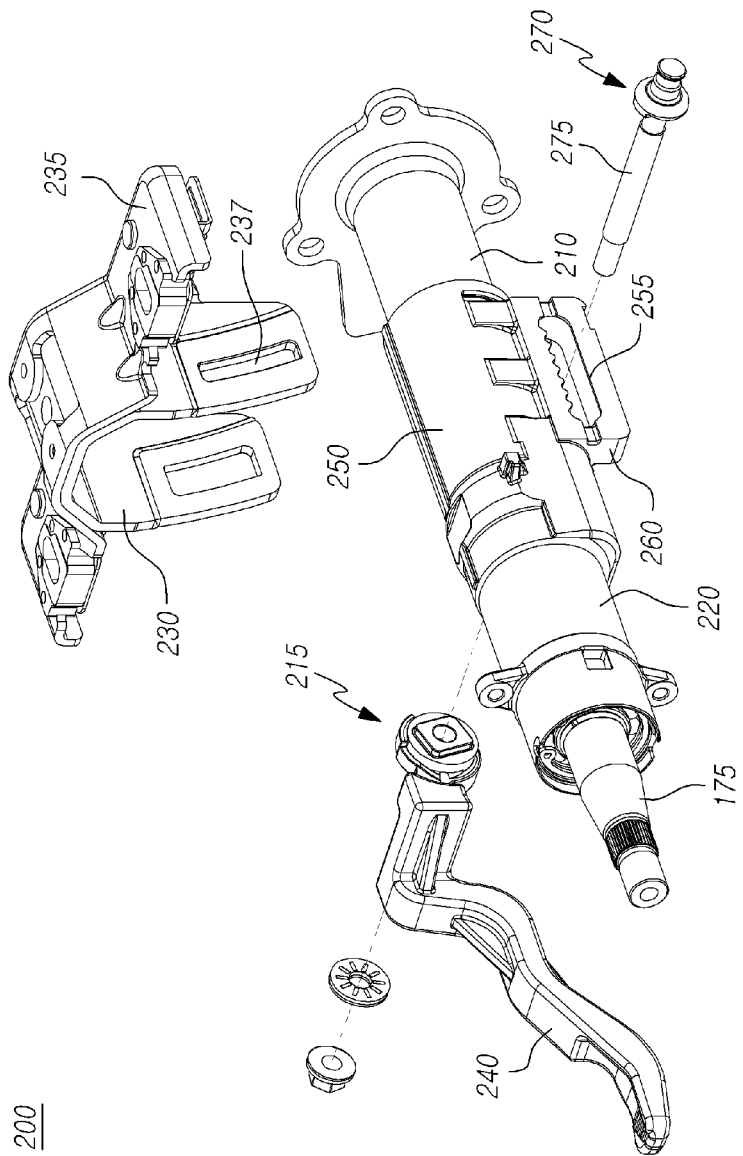
FIG. 2 is an exploded perspective view of a steering column for a vehicle according to an embodiment of the present invention.

FIG. 2 is an exploded perspective view of a steering column for a vehicle according to an embodiment of the present invention.

Referring to FIG. 2, the steering column 200 for a vehicle includes an inner tube 210, an outer tube 220, a tilt bracket 230, a lever 240, a distance part 250, a telescope guide 260, and an adjusting bolt 270.

The inner tube 210 surrounds a steering shaft 175. One end of the inner tube 210 is fixed to a vehicle body by a lower mounting bracket (not shown), and an opposite end thereof is inserted into an outer tube 220.

The distance part 250 is formed in the outer tube 220. The telescope guide 260 is provided at opposite sides of a lower end of the distance part 250, and a telescope slot 255 is formed in the telescope guide 260.

The tilt bracket 230 is fixed to a vehicle body to be integral with an upper mounting bracket 235, and tilt guide holes 237 are formed at opposite sides of the tilt bracket 230 to face each other. The tilt bracket 230 is located on left and right sides of the distance part 250, and the adjusting bolt 270 passes through the tilt guide hole 237 and the telescope slot 255 to be coupled thereto. A lever 240 and a cam 215 for fastening or releasing the tilt bracket 230 in a direction perpendicular to the steering shaft 175 to allow the tilt bracket 230 to press or release the telescope guide 260 are provided at one side of the adjusting bolt 270. The adjusting bolt 270 having passed through the tilt guide hole 237 and the telescope slot 255 is slid along the telescope slot 255.

Figure 3:
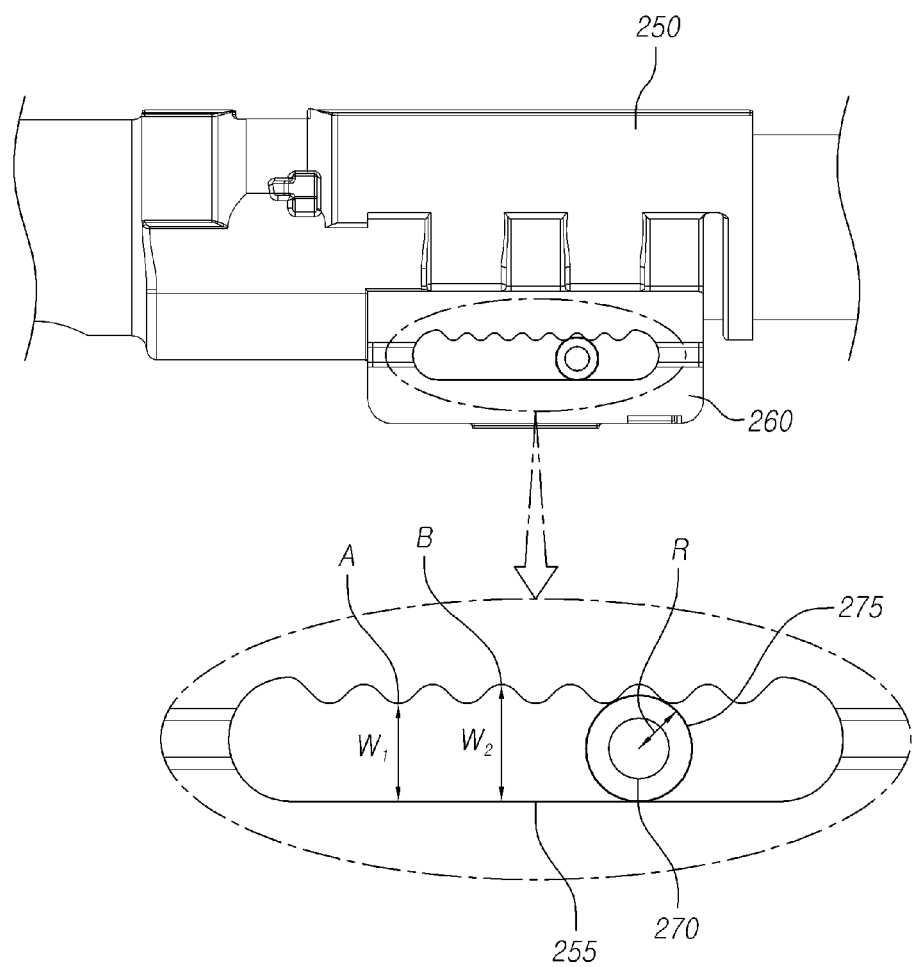
FIG. 3 is a view showing a state in which an adjusting bolt is coupled to a telescope slot of FIG. 2.

FIG. 3 is a view showing a state in which an adjusting bolt is coupled to a telescope slot of FIG. 2.

As shown in FIG. 3, as curved bosses and recesses are alternately formed on an inner surface of the telescope slot 255, narrow width portions A having a relatively small width and wide width portions B having a relatively large width are alternately disposed, in which case a width $W_1$ of the narrow width portions A is slightly smaller than a diameter 2R of the adjusting bolt 270 and a width $W_2$ of the wide width portions B is slightly larger than or similar to a diameter 2R of the adjusting bolt 270.

Figure 4:
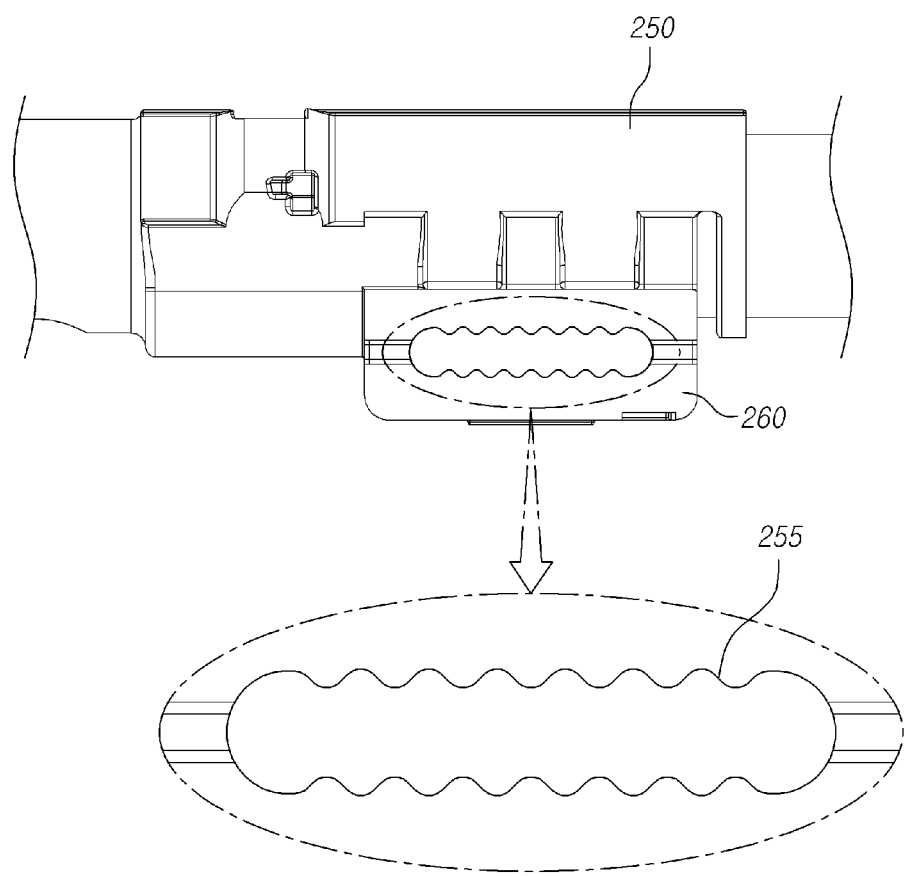
FIGS. 4 to 6 are views showing various embodiments of the telescope slot of FIG. 2.
Figure 5:
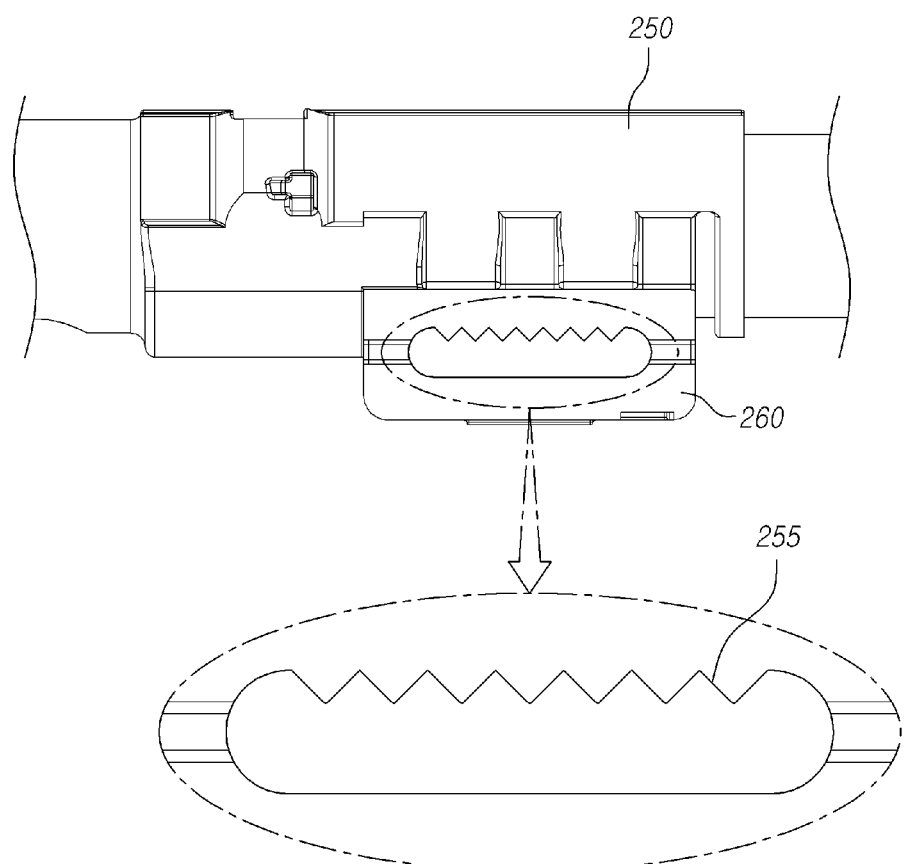
Figure 6:
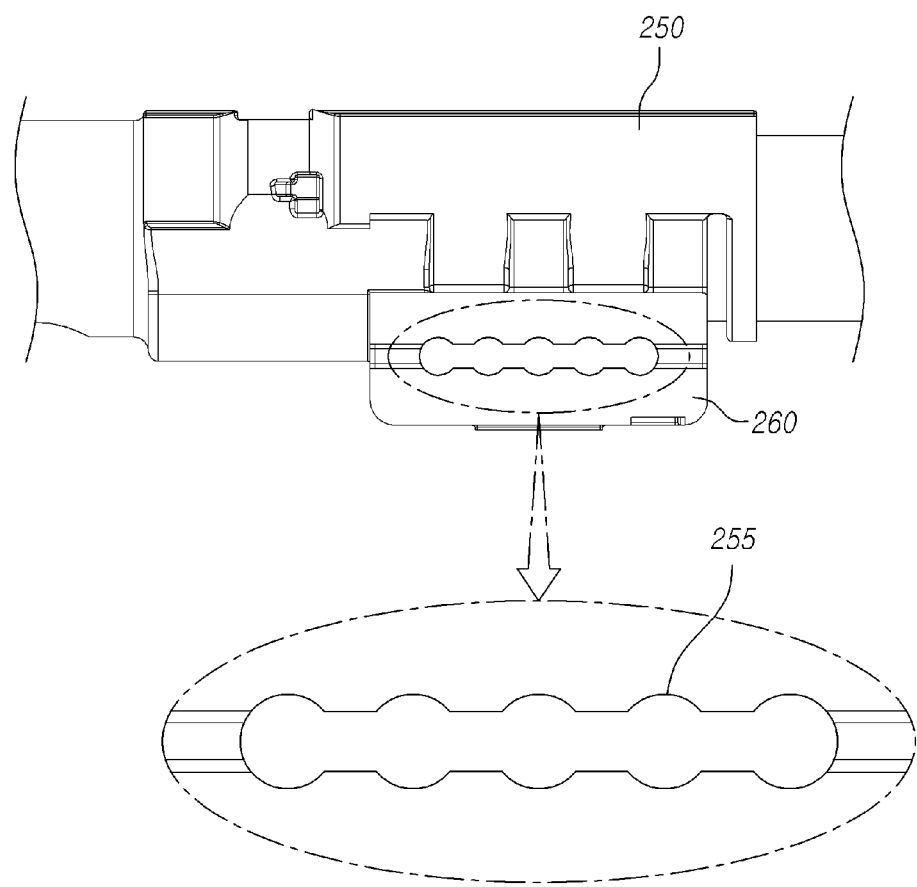

FIGS. 4 to 6 are views showing various embodiments of the telescope slot of FIG. 2.

In the telescope slot 255, curved bosses and recesses continuously formed on opposite inner surfaces of the telescope slot 255 may be alternately formed as shown in FIG. 4, or linear bosses and recesses continuously formed on an inner surface of the telescope slot 255 may be alternately formed as shown in FIG. 5.

As shown in FIG. 6, recesses may be formed on opposite inner surfaces of the telescope slot 255 at opposite locations thereof. Although not shown in the drawing, various embodiments of the telescope slot may be realized. For example, the linear bosses and recesses shown in FIG. 5 may be alternately formed on opposite inner surfaces of the telescope hole or the recesses shown in FIG. 6 may be formed only on an inner surface of the telescope slot 255.

Referring back to FIG. 3, a resiliently deformed portion 275 is formed at a portion of an outer peripheral surface of the adjusting bolt 270. As the adjusting bolt 270 passes through the narrow width portion A of the telescope slot 255 while the resiliently deformed portion 275 of the adjusting bolt 270 is resiliently deformed, so as to be positioned at the wide width portion B, the adjusting bolt 270 may be slid in stages in the telescope slot 255 during a telescopic operation.

Figure 7:
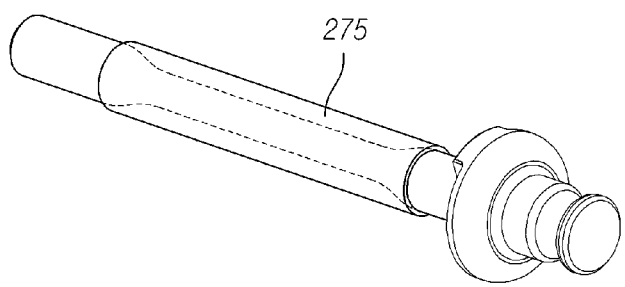
FIG. 7 is a perspective view of the adjusting bolt of FIG. 2.

As in the embodiments of FIGS. 2, 3, and 7, the resiliently deformed portion 275 of the adjusting bolt 270 may be formed by coupling a resilient tube to a portion of an outer peripheral surface of the adjusting bolt 270. In this case, the adjusting bolt 270 is slid in stages in the telescope slot 255 while the tube is resiliently deformed during a telescopic operation.

Figure 8:
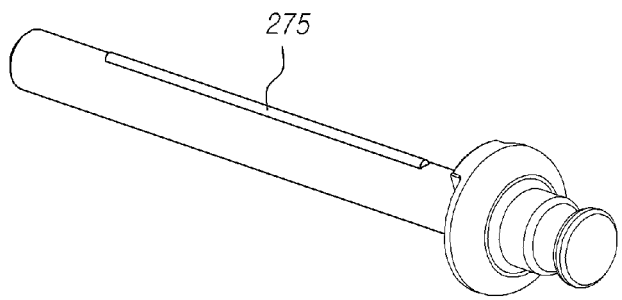
FIG. 8 is a perspective view of another embodiment of the adjusting bolt of FIG. 2.
Figure 9:
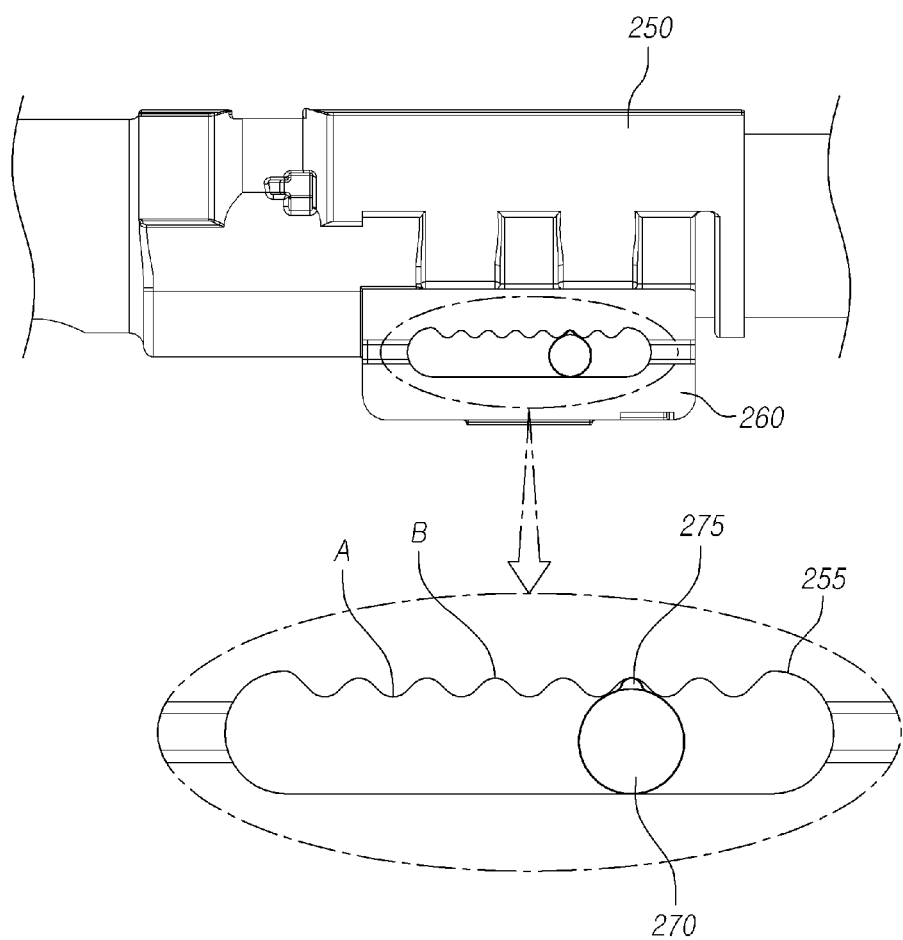
FIG. 9 is a view showing a state in which the adjusting bolt of FIG. 8 is coupled to a telescope slot.

As shown in FIGS. 8 and 9, in another embodiment of the resiliently deformed portion 275 of the adjusting bolt 270, a resilient rib may protrude from a portion of the adjusting bolt 270. Then, the adjusting bolt 270 passes through the narrow width portion A of the telescope slot 255 to be positioned at the wide width portion B while the rib is resiliently deformed during a telescopic operation.

Figure 10:
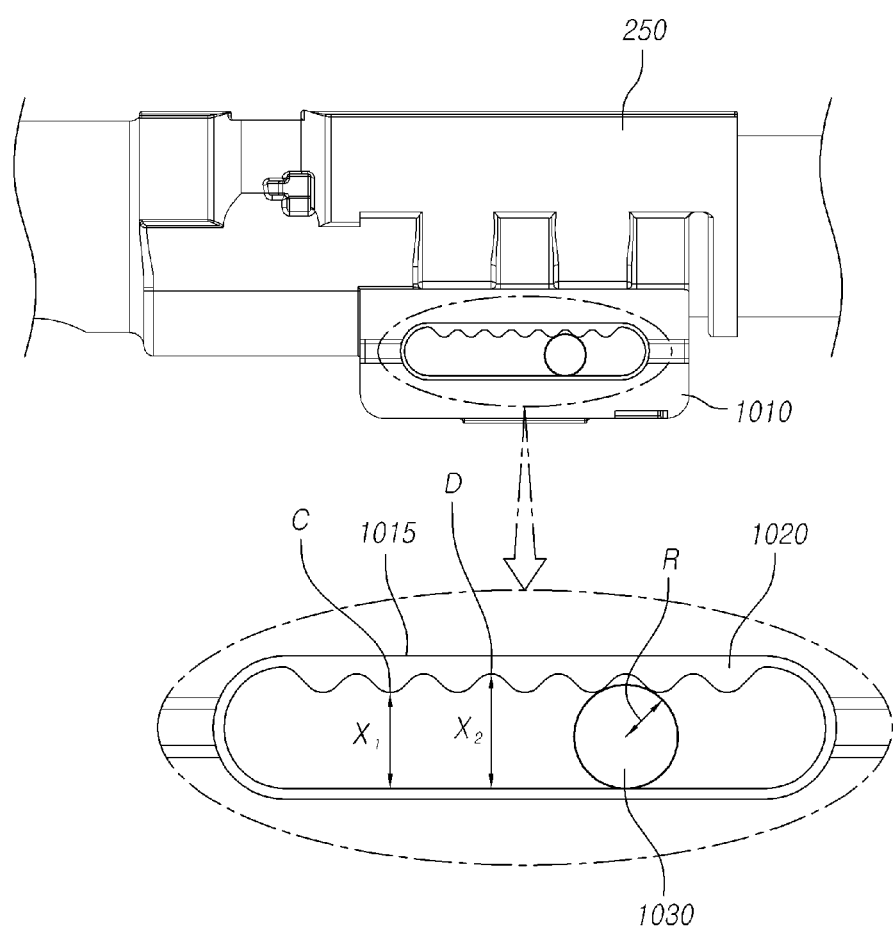
FIG. 10 is a view showing a state in which a telescope guide and an adjusting bolt of a steering column for a vehicle are coupled to each other according to another embodiment of the present invention.

FIG. 10 is a view showing a state in which a telescope guide and an adjusting bolt of a steering column for a vehicle are coupled to each other according to another embodiment of the present invention.

Referring to FIG. 10, the steering column for a vehicle according to the other embodiment of the present invention includes a telescope guide 1010 having an axial telescope slot 1015 for telescopic movements in stages, a resilient telescope bush 1020 coupled to the telescope slot 1015, and an adjusting bolt 1030 passing through the telescope bush 1020 to be coupled to the telescope bush 1020.

An inner peripheral surface of the telescope bush 1020 has narrow width portions C and wide width portions D which are alternately disposed. A width $X_1$ of the narrow width portions C is slightly smaller than a diameter 2R of the adjusting bolt 1030, and a width $X_2$ of the wide width portions D is slightly larger than or similar to the diameter 2R of the adjusting bolt 1030. An inner peripheral surface of the telescope bush 1020 may be realized in various embodiments such as the inner surfaces of the telescope slot 255 shown in FIGS. 4 to 6.

During a telescopic operation, as the adjusting bolt 1030 is slid while resiliently deforming the narrow width portion C of the telescope bush 1020, the adjusting bolt 1030 is positioned at the wide width portion D of the telescope bush 1020.

In this case, a resiliently deformed portion (not shown) may be formed even in the adjusting bolt 1030 passing through the telescope bush 1020, so that the narrow width portion C of the telescope bush 1020 and the resiliently deformed portion (not shown) of the adjusting bolt 1030 are deformed together while the adjusting bolt 1030 passes through the narrow width portion C of the telescope bush 1020, whereby the adjusting bolt 1030 can be slid in stages.

Figure 11:
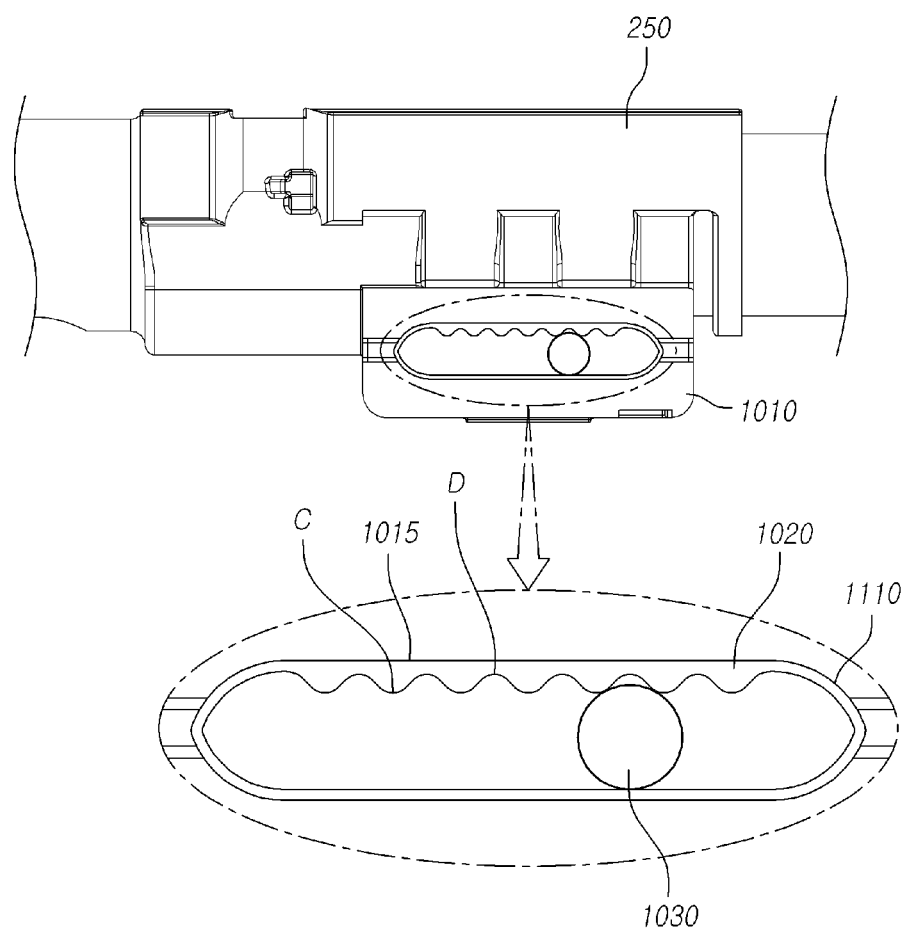
FIG. 11 is a view showing another embodiment of a telescope slot and a telescope bush of FIG. 10.

Meanwhile, as opposite peripheries 1110 of the telescope bush 1020 become gradually narrower or become narrower and a radius of curvature thereof is reduced at the same time as shown in FIG. 11, the above-described resilient telescope bush 1020 can mitigate an impact and noise when the adjusting bolt 1030 reaches opposite ends of the telescope guide 1010.

According to the present invention, since the adjusting bolt passing through and coupled to the telescope slot during a telescopic operation for adjusting a location of a steering wheel can be slid in stages in the telescope slot, a user can accurately and easily adjust a location of the steering wheel.

What is claimed is:

1. A steering column for a vehicle, comprising:
a telescope guide having a telescope slot in which narrow width portions and wide width portions are alternately disposed; and
an adjusting bolt passing through the telescope slot to be coupled to the telescope slot,
wherein a resiliently deformed portion of a resilient material is coupled to a portion of the adjusting bolt corresponding to the telescope slot such that the adjusting bolt is slid in stages during a telescopic operation, and
a width of the narrow width portions of the telescope guide is smaller than a diameter of the adjusting bolt.

2. The steering column as claimed in claim 1, wherein a width of the wide width portions of the telescope guide is larger than the diameter of the adjusting bolt.

3. The steering column as claimed in claim 1, wherein the resiliently deformed portion is formed by coupling a resilient tube to a portion of an outer peripheral surface of the adjusting bolt.

4. The steering column as claimed in claim 1, wherein the resiliently deformed portion is formed by protruding a resilient rib from a portion of an outer peripheral surface of the adjusting bolt.

5. A steering column for a vehicle, comprising:
a telescopic guide having a telescope slot in an axial direction thereof;
a resilient telescope bush coupled to the telescope slot and in which narrow width portions and wide width portions are alternately disposed; and
an adjusting bolt passing through the telescope bush to be coupled to the telescope bush and configured to be slid during a telescopic operation,
wherein a width of the narrow width portions is smaller than a diameter of the adjusting bolt.

6. The steering column as claimed in claim 5, wherein a width of the wide width portions is larger than the diameter of the adjusting bolt.

7. The steering column as claimed in claim 5, wherein opposite peripheries of the telescope bush become gradually narrower or become narrower and a radius of curvature thereof is reduced at the same time.

* * * * *